June 22, 1926.  
F. W. DARLING  
1,589,792  
CONTROL SYSTEM AND MECHANISM FOR AMUSEMENT COASTERS  
Filed July 10, 1925  
3 Sheets-Sheet 2

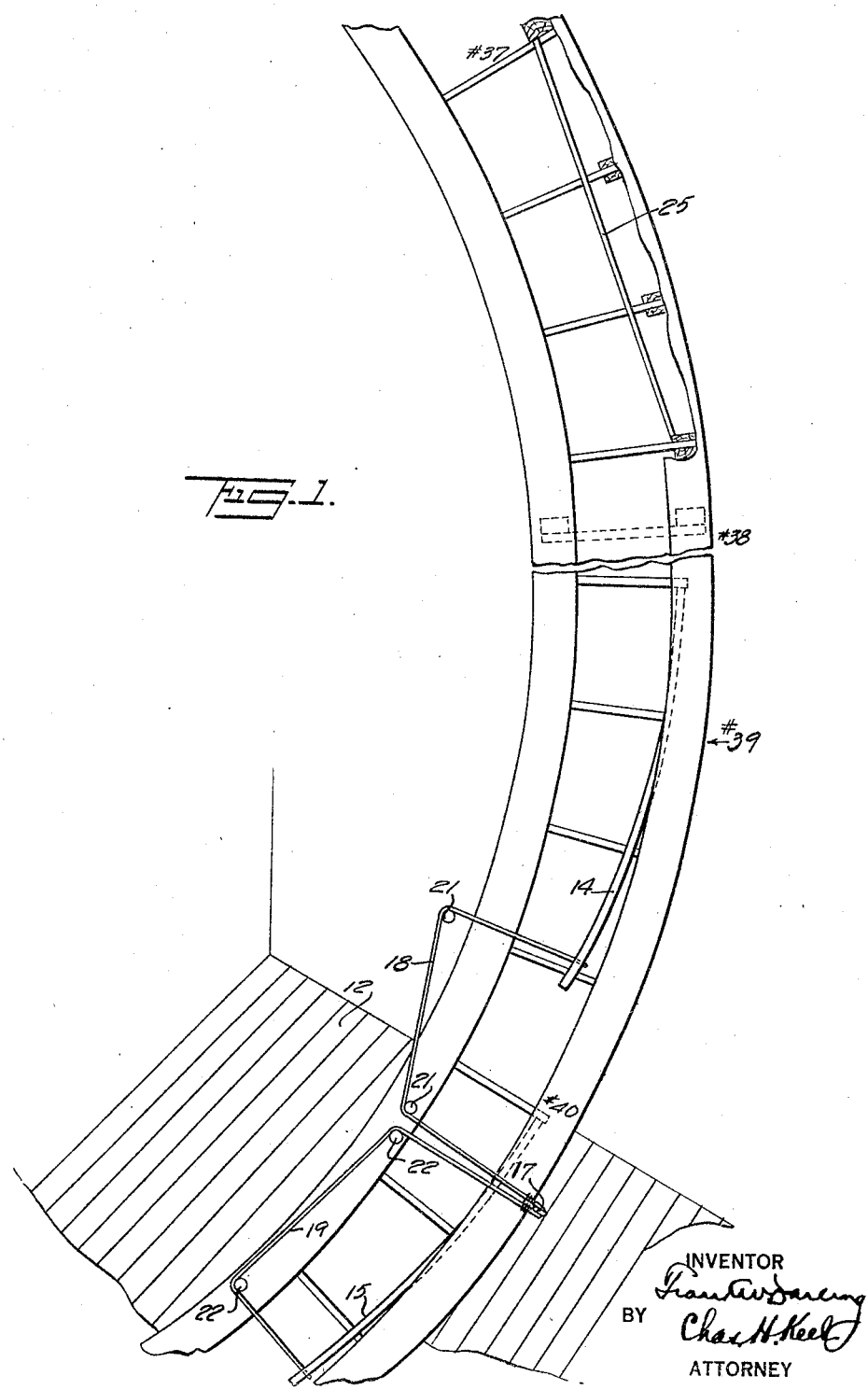

INVENTOR  
BY  
ATTORNEY

June 22, 1926.
F. W. DARLING
1,589,792
CONTROL SYSTEM AND MECHANISM FOR AMUSEMENT COASTERS
Filed July 10, 1925   3 Sheets-Sheet 3
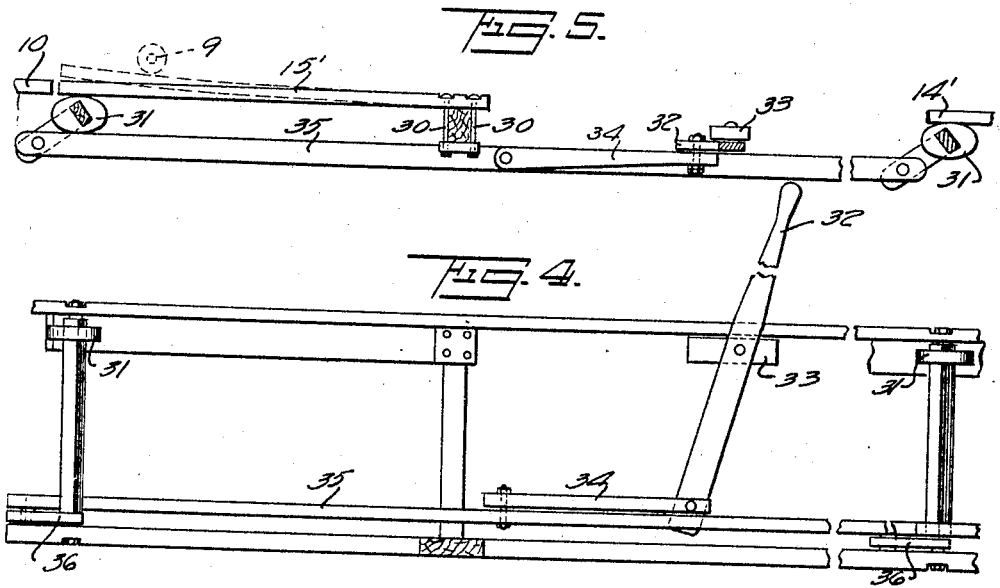
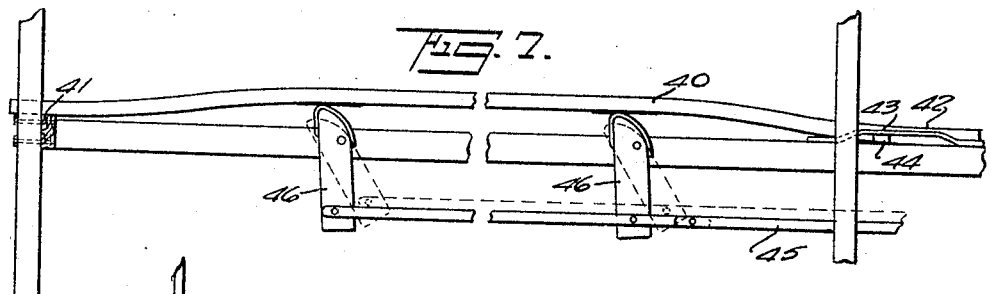
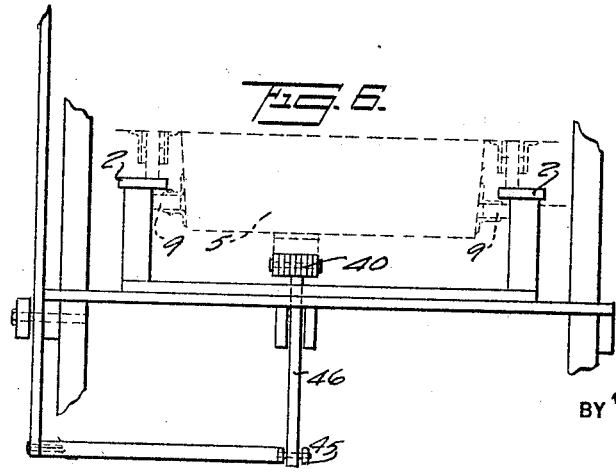
INVENTOR
Frank W. Darling
BY Chas. H. Keel
ATTORNEY Patented June 22, 1926.

1,589,792

UNITED STATES PATENT OFFICE.

FRANK W. DARLING, OF NEW YORK, N. Y., ASSIGNOR TO THE L. A. THOMPSON SCENIC RAILWAY COMPANY, OF NEW YORK, N. Y., A CORPORATION OF NEW JERSEY.

CONTROL SYSTEM AND MECHANISM FOR AMUSEMENT COASTERS.

Application filed July 10, 1925. Serial No. 42,642.

This invention relates to amusement coasters and particularly to a novel control system and mechanism incorporated therein for controlling and regulating the speed of the coaster cars in the vicinity of the terminal and assuring the bringing of the cars to rest when approaching the terminal with entire safety to the passengers and the equipment.

In the design and construction of amusement coasters and the like, a prime essential is safety in the control and operation thereof. For example, it is quite important that the coaster cars when approaching the terminus shall be under perfect control of the attendant or attendants at all times and under the uncertain conditions of varying loads carried by the cars, with the consequent variations in frictional resistance, momentum and velocity. The object of the present invention generally, is a system of control which is correlated with and as a part of the coaster track structure and on a down gradient such that the cars may be successively brought to rest at predetermined stopping points under the most severe service conditions and moreover whereby cars on approaching the terminus are automatically brought to rest in advance thereof, so long as a car is being held at the loading and unloading platform. To these ends I have incorporated as part of the track structure and in advance of the loading and unloading platform, a special friction braking mechanism which is always operable when a car is standing at the terminus or unloading platform, to slow up an approaching car and bring it safely to rest at a predetermined point in advance of the platform. This braking mechanism in the particular embodiment herein set forth includes an elongated friction brake member normally forming a part of the track structure and located a distance in advance of the platform which is greater than the length of a car or train of cars operated in unison and on a down gradient leading to the platform, whereby upon operation of the brake, the car or train of cars may be brought to rest at this point and when released from the brake permitted to roll by gravity on to the platform. My invention also includes a special track braking mechanism located directly at the platform to assure the stopping of the car or train of cars at the right spot for unloading and loading, and the special braking mechanism in advance of the platform is connected with the special brake at the platform so that while a car or train of cars is being held at the platform by the platform brake, the advance brake is set at emergency position to stop an approaching car or train of cars, and thereby prevent a collision.

It may be desirable in certain cases to incorporate as part of the track structure an emergency retarding mechanism in the form of friction devices incorporated into the track and in advance of the special braking mechanisms to slow up an unduly speeding car and the embodiment of my invention herein illustrated also includes such an emergency retarding mechanism.

A further object of the invention is a control and braking system of the above indicated character which is characterized by its simplicity in construction and operation and which may be inexpensively constructed and installed.

For a better understanding of the invention, including the above indicated novel features, and others which will hereinafter appear, reference may be had to the accompanying drawings forming a part of this application wherein:

Fig. 1 is a diagrammatic plan view of a coaster track embodying my invention,

Fig. 4 is a plan view, more or less diagrammatic, of a modified construction of brake operating mechanism, Fig. 5 is a side view thereof, and Figs. 6 and 7 are views more or less diagrammatic of another modified construction of brake and operating mechanism.

Figure 3:
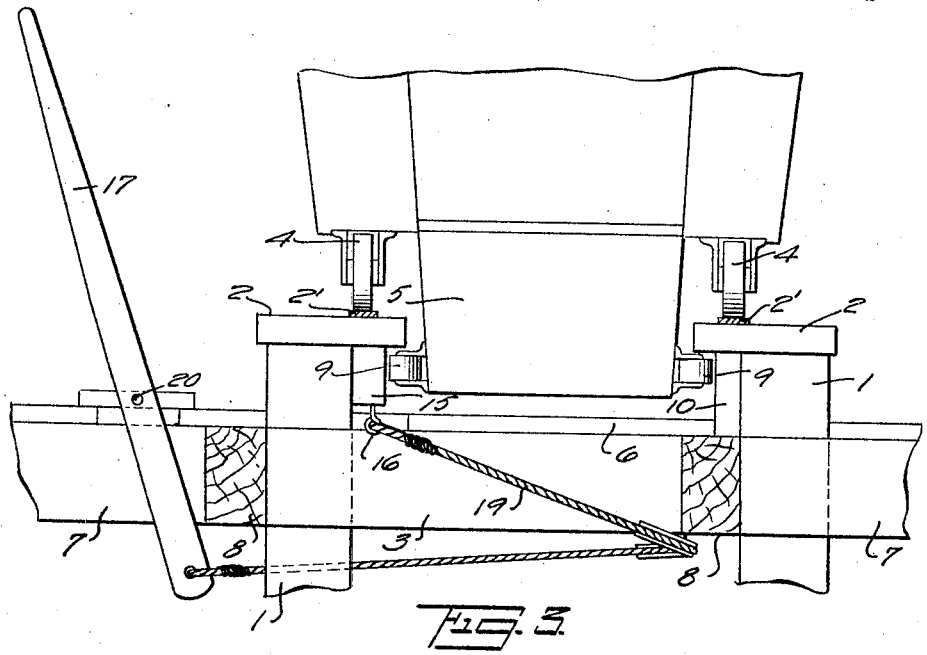
Fig. 3 is a sectional view through the coaster track with a coaster car mounted thereon.

Referring to the drawings, Fig. 3 indicates the construction of a special coaster track at the loading and unloading platforms with a coaster car mounted thereon. The track includes a pair of uprights 1 carrying on the top thereof the traction rails 2. These traction rails 2 overhang in an inward direction the uprights 1. The uprights 1 are connected by suitable girders 3. The coaster car includes a pair of traction wheels 4 which travel upon the traction rails 2, and between the traction wheels 4 a downwardly extending passenger compartment 5 projects down into the chute provided between the traction rails 2, this compartment 5 extending down to a point adjacent the track floor 6, the latter being carried by suitable floor girders 7 and joists 8. The coaster car carries on either side of the passenger compartment 5 a pair of guard or guide wheels 9, these wheels 9 having brackets, the upper parts of which extend underneath the overhanging traction rails 2. The guard wheels 9 ordinarily remain free from frictional contact with the track structure but are adapted, when the car tends to swerve from its course or when going around curves, to engage the vertical guard rails 10 which are disposed at either side of the track structure immediately below the overhanging traction rails and guide the car on its proper course. These guard rails 10 extend throughout that portion of the coaster track wherein the cars are operating by gravity, except at the platform station and other predetermined points where it is desired to form the guard rail into a special braking mechanism.

Figure 2:
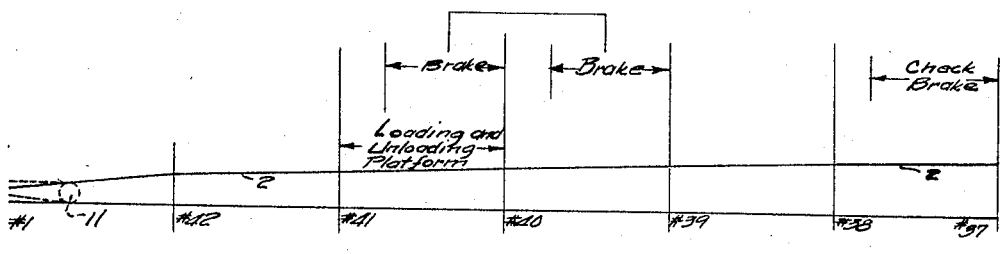
Fig. 2 is an elevational diagrammatic view thereof.

Referring to Figs. 1 and 2, I have indicated diagrammatically the terminus of the special coaster, certain points of which I have conveniently marked stations Nos. 37—42 and 1. The curve in Fig. 2 above the datum line indicates the traction rails between these points, it being observed that there is a gradual drop from station 37 to station 42 and on to the beginning of the conveyor indicated diagrammatically at 11. This conveyor is continuously operated to carry the coaster cars up to the highest elevation of the coaster track from which the cars gain their gravity. Between the points 40 and 41 I have indicated the disposition of the loading and unloading platforms and while a car or train of cars is standing at this platform, it is important that a car approaching from the rear shall be automatically slowed up and stopped at a point sufficiently in advance of the platform to permit the stopping of a car at the platform after passing such advanced point and to insure the timely automatic slowing up and stopping of an approaching car. Accordingly, at station 39 I have indicated a special braking mechanism 14 which is automatically set for operation when a car is being held at the platform to arrest and bring to a dead stop a car approaching from the rear, thereby avoiding a collision with a consequent injury to the car passengers and the equipment. A similar brake 15 is disposed between the points 40 and 41 for braking and holding a car at the platform and the arrangement is such that when the brake 15 is in operative position for holding one car at the platform, the brake 14 is thereby automatically set to prevent a second car or train of cars passing the point 39. In the particular embodiment illustrated in Figs. 1 and 3 the brakes 14 and 15 form sections of the guard or check rails 10 on one side of the track, these members 14 and 15 being in the form of elongated beams, one end each of which is securely fastened to the track structure in any suitable manner. The particular manner of fastening is unimportant and therefore omitted from the illustration.

The free ends of the brakes 14 and 15 are adapted to be moved inwardly toward the opposite guard or check rails 10 so as to narrow the chute therebetween and to firmly grip the guard wheels 9 carried by the coaster car. For this purpose each beam carries a vertical ring or eye bolt 16 at its free end and the track floor 6 is cut away to accommodate this bolt 16 and to permit it to be moved back and forth for operating the brake. The brake 14 is connected either directly or indirectly with the brake 15 so as to provide for the setting of the brake 14 when a car is being held at the platform by the brake 15. In the particular embodiment illustrated in Figs. 1 and 3, both of these brakes 14 and 15 are connected with a common operating lever 17 through the medium of cables 18 and 19 respectively. The lever 17 is connected with the track structure at 20 as a fulcrum point and the cables 18 and 19 are fastened in any suitable manner to the lower end of this lever 17. The other ends of the cables 18 and 19 are connected respectively with the bolts 16 and the free ends of the brake shoe members 14 and 15 and the cable 18 passes around suitable guide pulleys 21, while the cable 19 passes around suitable guide pulleys 22. By means of this arrangement a single attendant may control the unloading, loading and the starting and stopping of the coaster cars by simply standing in a position convenient to reach the lever 17. For example, when a car approaches a terminus and after it has passed the point 39 and the brake 14, the attendant, by operating the lever 17, sets the brake 15 to bring the car to a dead stop at the platform and since the brake 14 is connected with the brake 15 to be automatically set simultaneously therewith, it is in an emergency position to arrest another car which might approach before the unloading and loading of a car at the platform is completed. In this connection it is observed that the brake 14 must be disposed at a point sufficiently in advance of the platform to permit the operation of the brake 15 in time to stop a car at the platform after passing the special braking mechanism 14 and moreover this special braking mechanism 14 is preferably disposed on a down gradient so as to cause the car to run by gravity on to the platform after having been automatically stopped in advance thereof.

In some cases it may be advisable to install an emergency slowing up mechanism slightly in advance of the special braking mechanism to slow up any car which may be unduly speeding, for any reason, while approaching the terminus, so as to enable the special controlling and braking mechanisms, to operate with certainty under such conditions to slow up and promptly bring the cars to rest at predetermined points. For this purpose I have indicated an elongated brake member 25 disposed between the points 37 and 38, this elongated retarding or braking member 25 taking the place of the outer guard rail 10 of the curve at this point. This brake member narrows the chute between it and the opposed guard rail on the other side, the two members gripping the wheels 9 of the coaster car and by friction tending to arrest the car. The brake member 25 should be of a character and of the required dimensions for yieldingly gripping the outer guard wheels 9 as they engage the same on going around the curve, and I have found that a straight beam of wood, when properly dimensioned and adjusted with reference to the opposed guard rail 10 and mounted on a curve of the track, will give the desired resiliency and at the same time the desired slowing up and retarding movement without the necessity for any special springing out mechanism for the member 25. It may be adjusted or formed in a manner to impart the exact retarding effect desired. By means of this arrangement the speed of each car is brought within safe limits on approaching the terminus, notwithstanding variations in the weight of the car, the load carried thereby, and other special conditions.

In Figs. 4 and 5 I have illustrated a modified mechanism for operating the special braking mechanisms. The special brake members 14' and 15' are similar to and correspond with the brake members 14 and 15 respectively of Figs. 1 and 3. These brakes are fixed at one end to a fixed structural member of the track by means of bolts 30 while the free ends of these beams rest upon the cams 31, which cams normally permit the brake shoe members to be in a line with the side guard rails 10. The brakes are operated by the cams 31 and these in turn are operated by a common lever 32 fulcrumed on a block 33 and connected at its lower end by a pivoted link member 34 with an elongated link 35 connected by bell cranks 36 with the spaced cams 31. The operator, by manipulating the lever 32 may turn the cams 31 into positions to move the free ends of the brakes 14' and 15' into the path of the side guard rails 9 of the coaster car, as shown in dotted lines; the functioning and operation of the braking mechanism being similar to that illustrated in Figs. 1 and 3.

It may be desirable in certain cases to provide brake shoe members corresponding to the members 14 and 15 (14' and 15') which are laterally fixed at both ends, and capable of being distorted or bent out of their normal straight and alined form to bring their intermediate portions into frictional engagement with a portion of the coaster car. I have indicated such an arrangement in Figs. 6 and 7 wherein the brake shoe members are in the form of elongated distortable members 40, one end being fastened as at 41 with a fixed part of the track structure, while the other end is laterally fixed, but slidable within a fitting 42. This fitting includes two metallic straps 43 disposed on opposite sides of the end of the brake member 40 and an arm 44 passing through, or otherwise fastened to the slidable end of the member 40, the ends of member 44 being slidable underneath the straps 43. The brake shoe member 40 is of a character to be readily bent or distorted out of its normal position to a position in the path of a portion of the car, so that when the car passes along it will engage this member and thereby be stopped in that position. In certain cases it may be of advantage to arrange the brake shoes so as to close against the car or train of cars by perpendicular or vertical movements instead of lateral or side movements, as in Figs. 1 and 3. For example, in the particular embodiment here illustrated in Figs. 6 and 7, this brake shoe 40 is adapted to frictionally engage the bottom of the car 5 and to thereby tend to lift it from its track. The brackets of the guard rails 9, however, by coming in contact with the overhanging traction rails 2, prevent the dislocation of the car from the track and the car being firmly gripped between the brake 40 and the overhanging traction rails may be quickly brought to a standstill. The brake 40 may be actuated in any suitable manner as for example by a connecting link 45, connected with the cam members 46 which are adapted to engage the brake shoe 40 at points intermediate its ends to bulge it laterally of itself; the connecting link 45 may be connected to any convenient operating mechanism omitted in the drawing for convenience in illustration.

In either of the modifications shown in Figs. 3 and 6 therefore the cooperating locking and braking members are adapted to form closed passages for the car, either by narrowing the chute in a lateral direction or by narrowing it in a vertical direction, and in the embodiment of Fig. 6, the traction rails 2 form also the check or guard rails against which the car is actuated by the cooperating elongated brake and stopping members 40. According to these modifications the cars are positively brought to a dead stop, thereby providing a safe and sure control and stopping mechanism for the cars and preventing any possibility of derailment of the car and minimizing any possibility of accident due thereto or due to failure of the control mechanism.

Having thus described my invention, what I claim and desire to protect by Letters Patent is the following:

1. A coaster way upon which a coaster car is adapted to travel including a car locking and stopping member extending along the way against which the car is adapted to move in a direction transverse to the line of travel, a cooperating braking and stopping member laterally spaced from said first named member and operable in a direction transverse to the line of travel and relatively toward said first named member to lock the car therebetween and bring it to a positive stop, a second braking and stopping member spaced longitudinally along the track from said first cooperating member and relatively operable towards a car locking and stopping member to bodily move a car in binding engagement thereagainst and to arrest and lock it therebetween, connections between said cooperating brake operating stopping members for simultaneously actuating them and means for relatively operating the brake and cooperating locking members.

2. A coaster way upon which a coaster car is adapted to travel including a stationary check rail, said check rail extending along the traction way and adapted to engage a car when it tends to leave the coaster way and direct it back thereupon, a stop brake member laterally spaced from said check rail and adapted to engage the car and actuate it in a direction to bind against said check rail and form a closed passage for the car, a second stop brake spaced along the track from the first brake and similarly laterally spaced from the check rail for engaging a car and actuating it in a direction to bind against the rail and form another closed passage for a car at that point, connections between said stop brake members whereby they are simultaneously operated to close the passage for the cars at two different points and means for operating the stop brake members.

3. In a coaster way upon which a coaster car is adapted to travel, a downward gradient section thereof including a check rail along the coaster way, against which the car is adapted to be bodily moved in a direction transverse to the line of travel, an elongated stop brake member extending along the coaster way, said brake member being normally out of the path of the car but operable to a position to frictionally engage the same and actuate it in a direction towards said check rail in binding and stopping engagement therewith, a second stop brake spaced longitudinally along the track from the first brake, said second brake being of similar character to the first brake and also adapted to actuate a car in a direction to bind against a check rail, connections between the brakes causing the simultaneous operation thereof and the simultaneous closure of the coaster way to the passage of cars past either and means for operating said brakes.

4. In a coaster way, an unloading platform and a downward gradient section including a pair of traction rails upon which a coaster car is adapted to travel by gravity, a chute between said rails for the accommodation of a downwardly projecting part of the coaster car, a friction stop brake disposed along the chute and at the platform and operable to narrow the chute and form a closed passage on the track for said car, a second stop brake of similar character spaced rearwardly from the first brake by a distance greater than the length of a car and similarly to the first operable to a position in the path of the downwardly projecting part of an approaching car to form a closed passage therefor, operative connections between the first and second brakes whereby the first brake is automatically set to close the way when the second brake is in a position to hold the car at the platform, and means for operating said braking mechanisms.

5. In a coaster way, a pair of traction rails upon which a coaster car is adapted to travel, side walls below the level of said traction rails defining a chute therebetween for the accommodation of a downwardly projecting portion of a coaster car, said side walls including a pair of longitudinally spaced movable sections, each of which is adapted to be actuated to a point to narrow the chute between the walls, connections for operating one of said movable sections and connections between said movable sections whereby when one is set to operative position to narrow the chute, the other is simultaneously therewith set to narrow the chute.

6. A coaster way of the character set forth in claim 4 in which the friction brake members normally act as guard rails underneath the traction rails to guide the coaster car in its proper course.

7. A coaster way of the character set forth in claim 4 including a friction retarding mechanism disposed in advance of the two braking mechanisms set forth and adapted to retard the speed of an approaching car before it reaches the first of the special braking mechanisms.

8. In a coaster way upon which a coaster car is adapted to travel, a rail extending along the coaster way against which the car is adapted to bodily move in a direction transverse to the line of travel, an elongated stop brake member extending along the coaster way and spaced laterally from the rail, said brake stopping member being normally out of the path of a car but operable relatively to the rail to a position to frictionally engage a car and form a closed passage therebetween for the car and means for relatively operating said brake stopping and rail members.

9. A coaster way of the character set forth in claim 8 wherein the rail serves as a safety or check rail for directing the car back to its proper course upon the coaster way when it tends to depart therefrom and as a braking and locking member cooperating with the laterally spaced member for forming a closed passage for the car.

In testimony whereof, I have signed my name to this specification.

FRANK W. DARLING.